US011863368B2

(12) United States Patent
Wang et al.

(10) Patent No.: US 11,863,368 B2
(45) Date of Patent: Jan. 2, 2024

(54) METHOD AND APPARATUS FOR SUBSCRIBING TO EVENT STREAMS

(71) Applicant: HUAWEI TECHNOLOGIES CO., LTD., Guangdong (CN)

(72) Inventors: Jianbing Wang, Nanjing (CN); Xiaopeng Qin, Beijing (CN); Yu Yang, Beijing (CN); Qin Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 17/730,542

(22) Filed: Apr. 27, 2022

(65) Prior Publication Data

US 2022/0255789 A1   Aug. 11, 2022

Related U.S. Application Data

(63) Continuation of application No. PCT/CN2020/123655, filed on Oct. 26, 2020.

(30) Foreign Application Priority Data

Nov. 1, 2019   (CN) .......................... 201911060982.2

(51) Int. Cl.
*H04L 41/06* (2022.01)
*H04L 67/303* (2022.01)

(52) U.S. Cl.
CPC ............ *H04L 41/06* (2013.01); *H04L 67/303* (2013.01)

(58) Field of Classification Search
None
See application file for complete search history.

(56) References Cited

U.S. PATENT DOCUMENTS

| | | | |
|---|---|---|---|
| 7,254,616 B1 | 8/2007 | Ennis et al. | |
| 2017/0063946 A1* | 3/2017 | Quan | H04L 67/55 |
| 2019/0251457 A1* | 8/2019 | Byrnes | H04L 67/566 |
| 2021/0044549 A1* | 2/2021 | Renjith | G06F 16/9024 |

FOREIGN PATENT DOCUMENTS

| | | |
|---|---|---|
| CN | 102402420 A | 4/2012 |
| CN | 104009865 A | 8/2014 |
| CN | 105471604 A | 4/2016 |
| CN | 109981538 A | 7/2019 |
| CN | 109996216 A | 7/2019 |
| CN | 110113381 A | 8/2019 |
| WO | 2015117342 A1 | 8/2015 |

OTHER PUBLICATIONS

E. Voit et al, Subscribing to Event Notifications, draft-ietf-netconf-subscribed-notifications-00, NETCONF Internet-Draft, Feb. 23, 2017, 45 pages.
T. Zhou et al., Subscription to Multiple Stream Originators, draft-zhou-netconf-multi-stream-originators-06, NETCONF Internet-Draft, Jul. 7, 2019, 21 pages.

* cited by examiner

*Primary Examiner* — Angela Nguyen
(74) *Attorney, Agent, or Firm* — HUAWEI TECHNOLOGIES CO., LTD.

(57) ABSTRACT

Embodiments of this application provide a method for subscribing to event streams. The method includes: A first device generates a first message used to subscribe to event streams, where the first message includes a group identifier, and the group identifier corresponds to a plurality of event streams; and the first device sends the first message to a second device, to obtain data of the plurality of event streams corresponding to the group identifier.

20 Claims, 7 Drawing Sheets

METHOD AND APPARATUS FOR SUBSCRIBING TO EVENT STREAMS

CROSS-REFERENCE TO RELATED APPLICATIONS

This application is a continuation of International Application No. PCT/CN2020/123655, filed on Oct. 26, 2020, which claims priority to Chinese Patent Application No. 201911060982.2, filed on Nov. 1, 2019. The disclosures of the aforementioned applications are hereby incorporated by reference in their entireties.

TECHNICAL FIELD

This application relates to the communication field, and in particular, to a method and an apparatus for subscribing to event streams.

BACKGROUND

Currently, a device on which a network management protocol server is run obtains a state parameter of an event stream corresponding to a service requirement at a preset period. The device sends an event message to a controller on which a network management protocol client is run. The event message includes the state parameter of the event stream. The service requirement may correspond to a plurality of event streams, such as CPU usage and a port state. After states of the plurality of event streams corresponding to the service requirement are changed, the device sends a plurality of event messages to the controller. Consequently, communication overheads between the device and the controller are excessively high, and the controller may not respond to the event messages in a timely manner.

SUMMARY

Embodiments of this application provide a method and an apparatus for subscribing to event streams, so as to save network resources and improve a response speed.

According to a first aspect, a method for subscribing to event streams is provided. The method includes: A first device generates a first message used to subscribe to event streams, where the first message includes a group identifier, and the group identifier corresponds to a plurality of event streams; and the first device sends the first message to a second device, to obtain data of the plurality of event streams corresponding to the group identifier.

In the foregoing method, the first device may send the group identifier to the second device, so that the second device may report, based on the group identifier, the data of the plurality of event streams corresponding to the group identifier, thereby saving network resources and improving a response speed.

In an optional design, after the first device sends the first message to the second device, the method further includes: The first device receives a second message sent by the second device, where the second message includes a subscription identifier, and the subscription identifier is used to identify a subscription generated based on the plurality of event streams. In this way, the first device may learn, based on the subscription identifier, subsequently received data is for which subscription of a plurality of event streams.

In an optional design, after the first device sends the first message to the second device, the method further includes: The first device receives a third message sent by the second device, where the third message includes the subscription identifier and data of at least one event stream in the plurality of event streams.

In an optional design, the third message further includes the group identifier. In this way, the first device may directly learn the plurality of event streams corresponding to the data in the third message based on the group identifier in the third message.

In an optional design, after the first device receives the third message sent by the second device, the method further includes: The first device obtains a policy based on the data of the at least one event stream, where the policy is used to indicate the second device to perform an action corresponding to the at least one event stream; and the first device sends the policy to the second device. In this way, the second device may perform an action according to the policy, to improve processing efficiency.

In an optional design, before the first device sends the first message to the second device, the method further includes: The first device receives a capability identifier sent by the second device, where the capability identifier is used to identify that the second device supports subscribing to a plurality of event streams.

In an optional design, the first device and the second device communicate with each other by using a network configuration protocol NETCONF, and the capability identifier is represented as:
Netconf bulk-stream-sn capability:
urn:ietf:params:netconf:capability:bulk-stream-sn:1.0
or the first device and the second device communicate with each other by using a representational state transfer configuration protocol RESTCONF, and the capability identifier is represented as:
Restconf bulk-stream-sn capability:
urn:ietf:params:restconf:capability:bulk-stream-sn:1.0.

In an optional design, before the first device sends the first message to the second device, the method further includes: The first device sends a correspondence to the second device, where the correspondence includes the group identifier and the plurality of event streams. In this way, subsequently, the first device may directly deliver the group identifier to subscribe to the plurality of event streams on the second device, to simplify an operation.

According to a second aspect, a method for subscribing to event streams is provided. The method includes: A second device receives a first message used to subscribe to event streams that is sent by a first device, where the first message includes a group identifier, and the group identifier corresponds to a plurality of event streams; and the second device generates, based on the first message, a subscription corresponding to the plurality of event streams.

In the foregoing method, the second device may generate, based on the group identifier, the subscription corresponding to the plurality of event streams, thereby saving network resources.

In an optional design, after the generating the subscription corresponding to the plurality of event streams, the method further includes: The second device obtains a subscription identifier, where the subscription identifier is used to identify the subscription generated based on the plurality of event streams; and the second device sends a second message to the first device, where the second message includes the subscription identifier.

In an optional design, after the second device sends the second message to the first device, the method further includes: The second device obtains data of at least one event stream in the plurality of event streams; the second device generates a third message based on the data of the at least one event stream, where the third message includes the subscription identifier and the data of the at least one event stream; and the second device sends the third message to the first device.

In an optional design, that the second device obtains the data of the at least one event stream in the plurality of event streams includes: The second device determines, based on the group identifier, the plurality of event streams corresponding to the group identifier; and the second device periodically obtains data of one or more event streams in the plurality of event streams, or the second device obtains the data of the one or more event streams in the plurality of event streams after states of the one or more event streams are changed.

In an optional design, the third message further includes the group identifier.

In an optional design, before the second device receives the first message used to subscribe to event streams that is sent by the first device, the method further includes: The second device sends a capability identifier to the first device, where the capability identifier is used to identify that the second device supports subscribing to a plurality of event streams.

In an optional design, the second device and the first device communicate with each other by using a network configuration protocol NETCONF, and the capability identifier is represented as:

Netconf bulk-stream-sn capability:
urn:ietf:params:netconf:capability:bulk-stream-sn: 1.0 or the second device and the first device communicate with each other by using a representational state transfer configuration protocol RESTCONF, and the capability identifier is represented as:

Restconf bulk-stream-sn capability:
urn:ietf:params:restconf:capability:bulk-stream-sn:1.0.

In an optional design, after the generating the subscription corresponding to the plurality of event streams, the method further includes: The second device receives a policy sent by the first device, where the policy is used to indicate the second device to perform an action corresponding to the at least one event stream; and the second device performs the action according to the policy.

In an optional design, before the second device receives the first message used to subscribe to event streams that is sent by the first device, the method further includes: The second device receives a correspondence sent by the first device, where the correspondence includes the group identifier and the plurality of event streams.

According to a third aspect, an apparatus for subscribing to event streams is provided. The apparatus is disposed on a first device, and the apparatus includes a module that can implement a function corresponding to any one of the first aspect or the optional designs of the first aspect.

According to a fourth aspect, an apparatus for subscribing to event streams is provided. The apparatus is disposed on a second device, and the apparatus includes a module that can implement a function corresponding to any one of the second aspect or the optional designs of the second aspect.

According to a fifth aspect, a computer-readable storage medium is provided. The computer-readable storage medium includes instructions, and when the instructions are run on a computer, the computer is enabled to perform the method for subscribing to an event stream according to any one of the second aspect or the optional designs of the second aspect.

According to a sixth aspect, a computer-readable storage medium is provided. The computer-readable storage medium includes instructions, and when the instructions are run on a computer, the computer is enabled to perform the method for subscribing to an event stream according to any one of the second aspect or the optional designs of the second aspect.

According to a seventh aspect, a computer program product including instructions is provided. When the computer program product runs on a computer, the computer is enabled to perform the method for subscribing to an event stream according to any one of the first aspect or the optional designs of the first aspect.

According to an eighth aspect, a computer program product including instructions is provided. When the computer program product runs on a computer, the computer is enabled to perform the method for subscribing to an event stream according to any one of the second aspect or the optional designs of the second aspect.

According to a ninth aspect, an apparatus for subscribing to an event stream is provided. The apparatus includes: a processor, a memory, a bus, and a communication interface. The memory is configured to store computer-executable instructions, and the processor is connected to the memory through the bus. When the apparatus runs, the processor executes the computer-executable instructions stored in the memory, to enable the apparatus to perform the method for subscribing to an event stream in any one of the first aspect and the optional designs of the first aspect. The apparatus may be the first device mentioned in any one of the first aspect or the optional designs of the first aspect.

According to a tenth aspect, an apparatus for subscribing to an event stream is provided. The apparatus includes: a processor, a memory, a bus, and a communication interface. The memory is configured to store computer-executable instructions, and the processor is connected to the memory through the bus. When the apparatus runs, the processor executes the computer-executable instructions stored in the memory, to enable the apparatus to perform the method for subscribing to an event stream in any one of the second aspect and the optional designs of the second aspect. The apparatus may be the second device in any one of the second aspect or the optional designs of the second aspect.

According to an eleventh aspect, a system for subscribing to an event stream is provided. The system includes the apparatus provided in the third aspect or the ninth aspect, and the apparatus provided in the fourth aspect or the tenth aspect.

DESCRIPTION OF EMBODIMENTS

The following describes the embodiments of the present disclosure with reference to accompanying drawings.

An embodiment of this application provides a method for subscribing to event streams. In this method, a first device can subscribe to a plurality of event streams of a second device at a time. The second device may report, to the first device based on the subscription, data of one or more event streams that is required by the first device. Specifically, the first device generates a first message used to subscribe to event streams, where the first message includes a group identifier, and the group identifier corresponds to a plurality of event streams; and the first device sends the first message to the second device, to obtain data of the plurality of event streams corresponding to the group identifier. After receiving the first message, the second device generates, based on the group identifier included in the first message, a subscription corresponding to the plurality of event streams.

Figure 1:
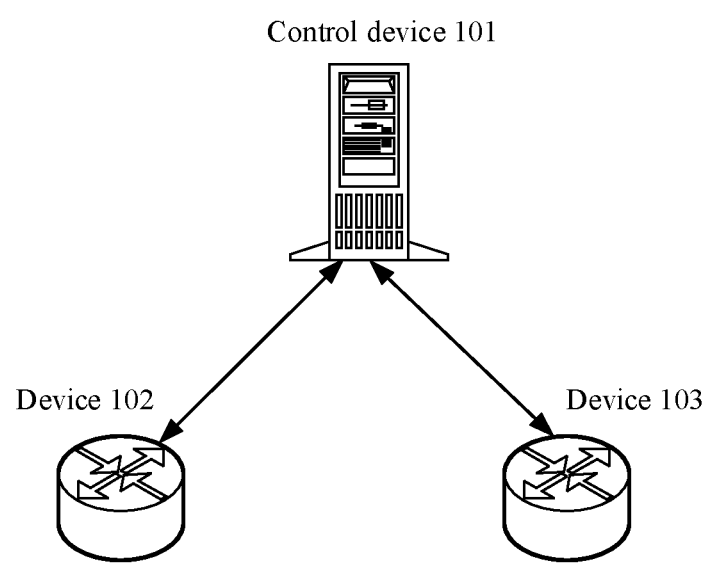
FIG. 1 is a schematic diagram of a network scenario according to an embodiment of this application.

FIG. 1 is a schematic diagram of a network scenario according to an embodiment of this application. In the network scenario shown in FIG. 1, a control device 101 can perform subscription setting for a device 102 and a device 103. For example, the control device 101 is a client on which a network management protocol is run. The device 102 and the device 103 are both servers on which a network management protocol is run. A communication protocol used between the control device 101 and the device 102 is a network management protocol, and may be specifically a network configuration protocol (NETCONF) or a representational state transfer configuration protocol (RESTCONF). A communication protocol used between the control device 101 and the device 103 is the same as the communication protocol used between the control device 101 and the device 102. The device 102 and the device 103 may be any network device that supports the foregoing network management protocol, for example, a router, a switch, or a server.

Figure 2:
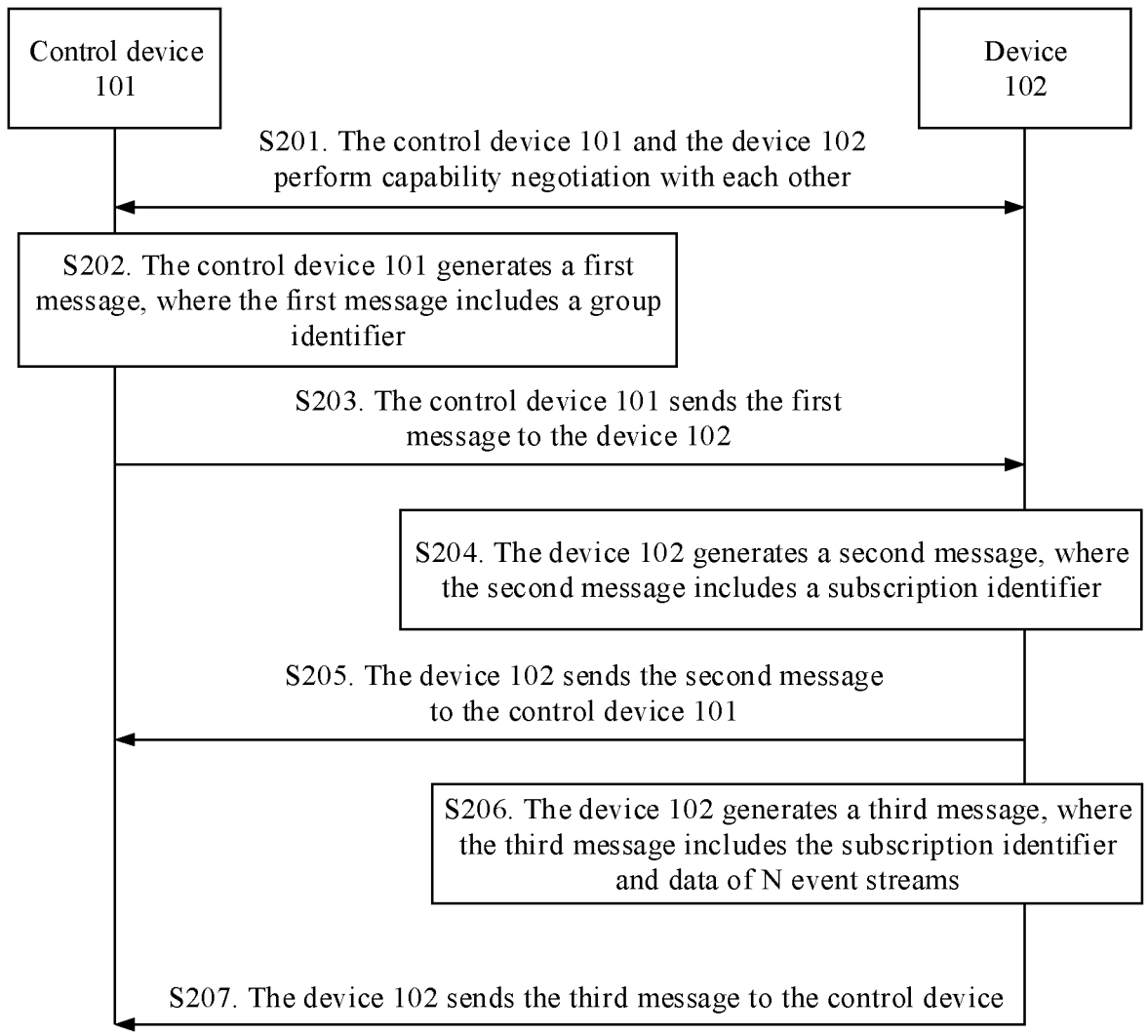
FIG. 2 is a schematic flowchart of a method for subscribing to event streams according to Embodiment 1 of this application.

FIG. 2 is a schematic flowchart of a method for subscribing to event streams according to Embodiment 1 of this application. The method for subscription provided in this embodiment of this application is now described by using interaction between the control device 101 and the device 102 as an example with reference to FIG. 1 and FIG. 2.

S201: The control device 101 and the device 102 perform capability negotiation with each other.

For example, the control device 101 and the device 102 establish a session that is based on a network management protocol. The device 102 sends a capability identifier to the control device 101, where the capability identifier is used to identify that the second device supports subscribing to a plurality of event streams. For example, the device 102 sends a hello message to the control device 101, and the hello message includes the capability identifier. When the network management protocol is NETCONF, the capability identifier included in the hello message may use the following form:
  Netconf bulk-stream-sn capability:
  urn:ietf:params:netconf:capability:bulk-stream-sn:1.0

When the network management protocol is RESCONF, the capability identifier included in the hello message may use the following form:
  Restconf bulk-stream-sn capability:
  urn:ietf:params:restconf:capability:bulk-stream-sn:1.0

Netconf bulk-stream-sn capability represents a capability of bulk event streams under NETCONF. Restconf bulk-stream-sn capability represents a capability of bulk event streams under RESTCONF. bulk-stream-sn:1.0 represents supporting subscribing to bulk event streams. The bulk event streams may also be referred to as a plurality of event streams. An event stream is a group of continuous events that are sorted in a chronological order and that are converged in some cases, for example, system restart related parameters, node configuration information, node status information, alarm events, and delays.

By using an example in which the network management protocol is NETCONF, the hello message uses the following format:

```
<hello xmlns="urn:ietf:params:xml:ns:netconf:base:1.0">
<capabilities>
<capability>
urn:ietf:params:netconf:base:1.1
</capability>
<capability>
urn:ietf:params:netconf:capability:startup:1.0
</capability>
<capability>
urn:ietf:params:netconf:capability: bulk-stream-sn:1.0
</capability>
</capabilities>
<session-id>4</session-id>
</hello>
```

For example, after receiving the capability identifier of the device 102, the control device 101 may learn that the device 102 supports subscribing to a plurality of event streams. The control device 101 may determine the plurality of event streams based on a configuration or a requirement. The control device 101 packages the plurality of event streams into one group, and configures a corresponding group identifier. The control device 101 obtains a correspondence, where the correspondence includes the group identifier and the plurality of event streams corresponding to the group identifier. The group identifier is an index of bulk subscription models. The correspondence may be represented by using the bulk subscription models. The bulk subscription models are models that subscribe to a plurality of event streams by using YANG models. The control device 101 may send the correspondence to the device 102.

A model that is related to the correspondence and that is in the bulk subscription models may be represented as follows:

```
module: ietf-bulk-subscription
  +--rw groups
     +--rw group* [group-id]
        +--rw group-id    string
        +--rw stream*     string
``` where module: ietf-bulk-subscription represents that the data model is the bulk subscription model. group-id represents the group identifier. stream* represents the plurality of event streams.

For example, a requirement based on which the control device 101 packages the plurality of event streams may be a service requirement. The service requirement may correspond to a plurality of event streams. For example, when the service requirement is service assurance, the event stream may be an alarm event. The alarm event may be specifically a device alarm, a communication alarm, a processing error alarm, or the like. When the service requirement is service assurance, the event stream may be alternatively a threshold, a delay, QoS, or the like of a service parameter. When the service requirement is fault diagnosis, the event stream may be a response time, a cyber attack, CPU usage, or the like.

S202: The control device 101 generates the first message, where the first message includes the group identifier.

For example, the control device 101 subscribes to the plurality of event streams on the device 102 by sending the first message, to obtain the data of the plurality of event streams corresponding to the group identifier.

The first message may use the following format to send the group identifier, to subscribe to the plurality of event streams corresponding to the group identifier.

```
augment/sn:subscriptions/sn:subscription/sn: target:
   +--:(stream-group)
      +--rw group-id?    ->/groups/group/group-id
augment/sn:establish-subscription/sn:input/sn:target:
   +--:(stream-group)
      +-- group-id?    ->/groups/group/group-id
``` where augment/sn:subscriptions/sn:subscription/sn:target represents a configured subscription. augment/sn: establish-subscription/sn:input/sn:target represents a dynamic subscription. The dynamic subscription may be implemented through remote procedure call (RPC).

Optionally, the first message further includes bulk notification models. The bulk notification models are models used by the device 102 to report, to the control device 101, the data corresponding to the plurality of event streams. The bulk notification model may use the following form:

```
module: ietf-bulk-notification
   augment-structure/nm:message/nm:message-header:
      +--rw message-type  identityref
      +--rw group-id?     string
``` where ietf-bulk-notification represents that the data model is the bulk notification model. group-id represents the group identifier.

Optionally, the second message further includes a message identifier, so that when a second message that includes a subscription identifier and that is sent by the device 102 is received, it is determined, based on the message identifier carried in the second message, that the subscription identifier corresponds to the group identifier.

S203: The control device 101 sends the first message to the device 102.

For example, the control device 101 may send the first message to the device 102 by using the network management protocol.

S204: The device 102 generates the second message, where the second message includes the subscription identifier.

For example, the device 102 generates the subscription based on the group identifier in the first message and obtains the subscription identifier. The subscription identifier may be a randomly generated identifier. Subscription generation is to enable, by issuing a configuration command or a configuration invoking command, the device to report data based on a data model. The subscription identifier included in the second message generated by the device 102 may use the following form.

```
+--ro output
   +--ro                          id subscription-id
   +--ro replay-start-time-revision?  yang:date-and-time
      {replay}?
``` where output represents a reply. id represents the subscription identifier (subscription-id).

Optionally, the second message further includes the message identifier. The device 102 sends the message identifier and the subscription identifier to the control device 101, so that the control device 101 determines, based on the message identifier, that the subscription identifier corresponds to the group identifier.

S205: The device 102 sends the second message to the control device 101.

For example, the device 102 may send the second message to the control device 101 by using the network management protocol.

S206: The device 102 generates a third message, where the third message includes the subscription identifier and data of N event streams.

For example, the device 102 determines, based on the correspondence in the received bulk subscription model and the group identifier in the first message, the plurality of event streams subscribed by the control device 101. The device 102 periodically obtains the data corresponding to the N event streams, or obtains the data of the N event streams when states corresponding to the N event streams are changed. N is an integer greater than or equal to 1. The plurality of event streams corresponding to the group identifier include the N event streams. To save network resources and improve a response speed, the N event streams may be the plurality of event streams corresponding to the group identifier. The device 102 generates the third message based on the subscription identifier and the data of the N event streams.

The third message may use the following format to report the subscription identifier and the data of the N event streams.

structure message

```
+--ro message!
   +--ro message-header
   |  +--ro message-time            yang: date-and-time
   |  +--ro message-id              uint32
   |  +--ro message-generator-id?   string
   |  +--ro notification-count?     uint16
   +--ro notifications*
   |  +--ro notification-header
   |  |  +--ro notification-time       yang:date-and-time
   |  |  +--ro yang-module?            yang:yang-identifier
   |  |  +--ro subscription-id*        uint32
   |  |  +--ro notification-id?        uint32
   |  |  +--ro observation-domain-id?  string
   |  +--ro notification-contents?
   |  +--ro notification-footer!
   |     +--ro signature-algorithm   string
   |     +--ro signature-value       string
   |     +--ro integrity-evidence?   string
   +--ro message-footer!
      +--ro signature-algorithm   string
      +--ro signature-value       string
      +--ro integrity-evidence?   string
``` where structure message represents the format of the message. subscription-id represents the subscription identifier. The data of the N event streams may be carried in notification-contents. The device 102 may report the data of the N event streams through bulk reporting and notification.

Optionally, the third message further includes the group identifier, so that the control device 101 determines, based on the group identifier, requirements or configurations to which the data is related. The third message may carry the group identifier by using the following format.

```
module: ietf-bulk-notification
    augment-structure/nm:message/nm:message-header:
      +--rw message-type   identityref
      +--rw group-id?      string
``` where group-id represents the group identifier. message-header represents a message header. ietf-bulk-notification represents bulk notification. augment-structure /nm:message/nm:message-header represents that the group identifier is carried in the message header of structure message.

S207: The device 102 sends the third message to the control device 101.

For example, the device 102 may send the third message to the control device 101 by using the network management protocol.

In the method provided in Embodiment 1 of this application, the device 102 can obtain, based on the group identifier sent by the control device 101, the data of the N event streams corresponding to the group identifier. The N event streams are event streams subscribed by the control device 101. The data of the plurality of event streams is obtained through subscription at a time, thereby saving network resources.

Embodiment 2

Figure 3:
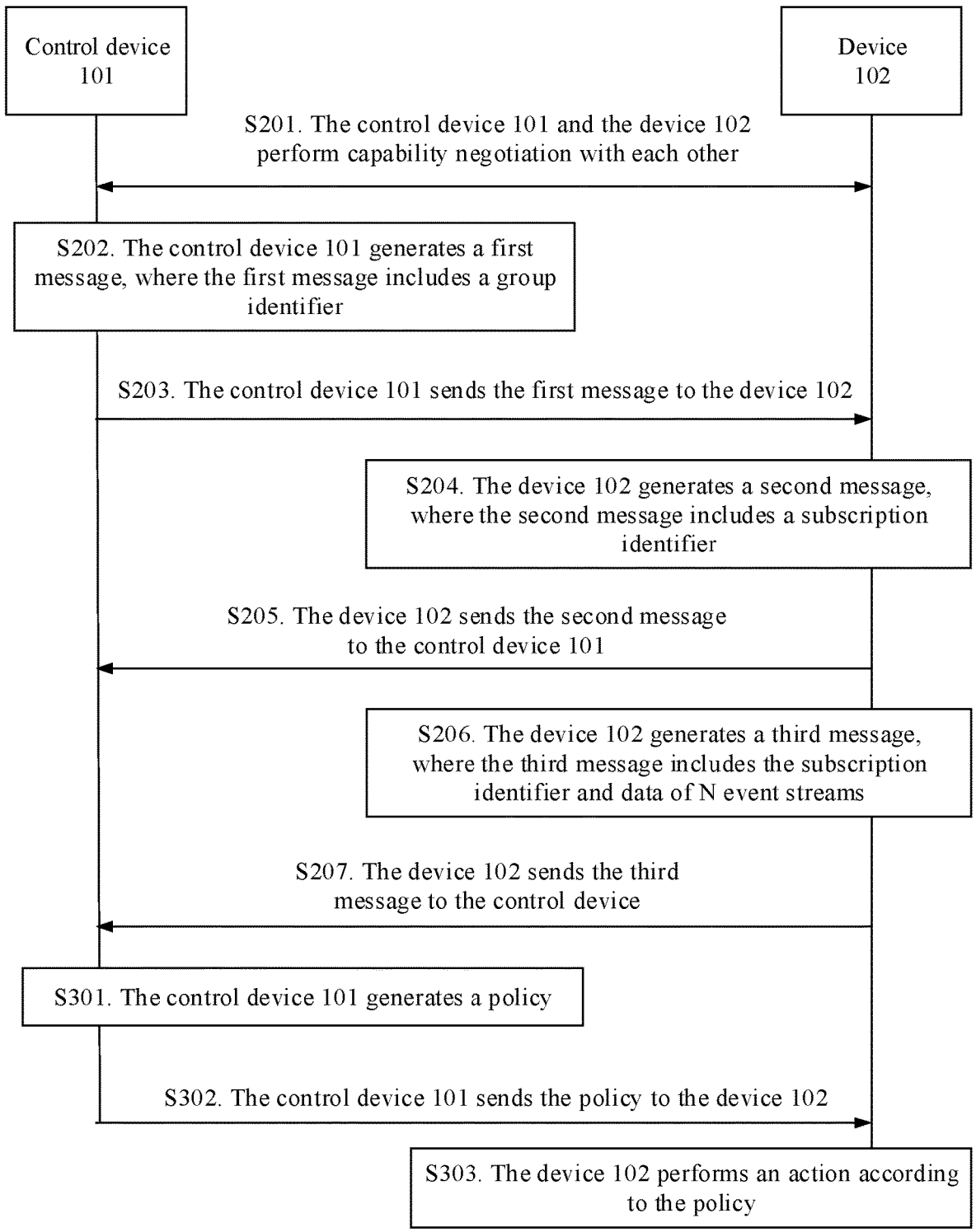
FIG. 3 is a schematic flowchart of a method for subscribing to event streams according to Embodiment 2 of this application.

FIG. 3 is a schematic flowchart of a method for subscribing to event streams according to Embodiment 2 of this application. The devices in the network scenario shown in FIG. 1 may alternatively use the method provided in the embodiment corresponding to FIG. 3. The method provided in Embodiment 2 differs from the method provided in Embodiment 1 in content of S301 to S303.

For content of S201 to S207 in Embodiment 2, refer to corresponding content of S201 to S207 in Embodiment 1. Details are not described herein again. The following describes the content of S301 to S303 with reference to FIG. 1 and FIG. 3.

S301: The control device 101 generates a policy.

For example, the control device 101 generates the policy based on the data of the N event streams that is reported by the device 102, where the policy is used to indicate the device 102 to perform an action corresponding to the N event streams. By using an example in which the plurality of event streams subscribed by the control device 101 are alarm events caused by faults, a fault of a module 1 on the device 102 causes an alarm event 1, a module 2 on the device 102 causes an alarm event 2 due to invocation of the faulty module 1, and a module 3 on the device 102 causes an alarm event 3 due to invocation of the module 2. The modules on the device 102 may be hardware or software. This is not limited in this embodiment of this application. The device 102 may collect statistics on the foregoing alarm events, and determine, based on a statistical quantity and a preset threshold, whether to notify a user. The device 102 reports the alarm event 1, the alarm event 2, and the alarm event 3 to the control device 101. The control device 101 learns, based on the alarm event 1, the alarm event 2, and the alarm event 3, that the alarm event 2 and the alarm event 3 are caused by the alarm event 1, for example, learn the foregoing content based on a time at which an alarm is generated and/or an invoking relationship between the modules. The control device 101 determines that the alarm event 1 is a valid alarm, and the alarm event 2 and the alarm event 3 are invalid alarms. The policy is to confirm the alarm event 1 and clear the alarm event 2 and the alarm event 3.

S302: The control device 101 sends the policy to the device 102.

For example, the control device 101 sends the policy to the device 102 by using the network management protocol.

S303: The device 102 performs an action according to the policy.

For example, the device 102 performs the corresponding action according to the policy. Using the foregoing alarm events as an example, the device 102 clears the alarm event 2 and the alarm event 3, and confirms the alarm event 1. Optionally, the device 102 may further notify the user of the alarm event 1 after confirming the alarm event 1, to efficiently clear a fault.

In the method provided in Embodiment 2 of this application, the control device 101 may determine the policy based on the data of the N event streams that is reported by the device 102, so that the device 102 adjusts the action for the event streams, thereby improving a response speed and troubleshooting efficiency.

The control device in this embodiment of this application may include a cloud controller and a cloud analyzer, or the control device is a cloud analyzer, or the control device is a device that integrates functions of the cloud controller and the cloud analyzer.

The messages, identifiers, data, and the like in the method provided in this embodiment of this application may all be expressed by using the data model in the YANG models.

Figure 4:
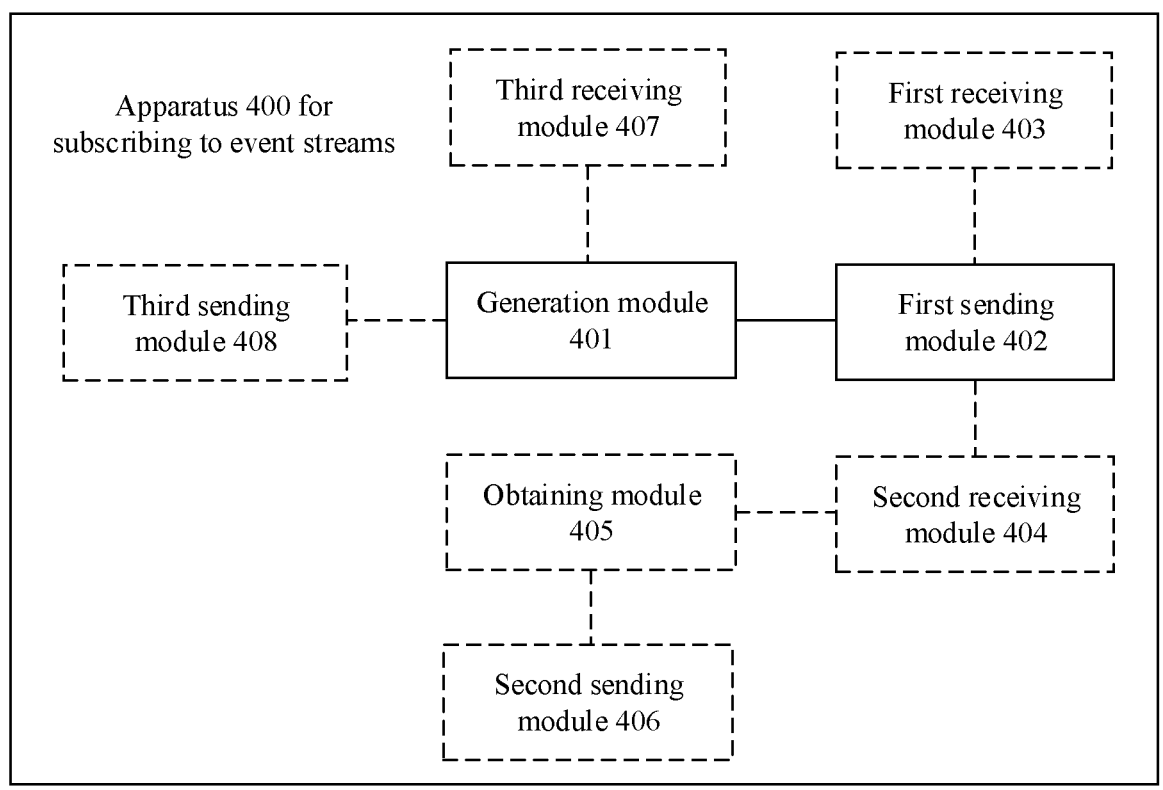
FIG. 4 is a schematic diagram of a structure of an apparatus for subscribing to event streams according to an embodiment of this application.

FIG. 4 is a schematic diagram of a structure of an apparatus for subscribing to event streams according to an embodiment of this application. The apparatus 400 provided in the embodiment corresponding to FIG. 4 is described from a perspective of a logical structure. The apparatus 400 provided in the embodiment corresponding to FIG. 4 may be the control device 101 in Embodiment 1 or Embodiment 2. A second device in the embodiment corresponding to FIG. 4 may be the device 102 in Embodiment 1 or Embodiment 2. With reference to FIG. 4, the following describes the structure of the apparatus provided in this embodiment of this application.

The apparatus 400 includes a generation module 401 and a first sending module 402. The generation module 401 is configured to generate a first message used to subscribe to event streams. The first message includes a group identifier, and the group identifier corresponds to a plurality of event streams. The first sending module 402 is configured to send the first message to the second device, to obtain data of the plurality of event streams corresponding to the group identifier. The generation module 401 is configured to support the apparatus 400 in performing step S202 in Embodiment 1 or Embodiment 2. The first sending module 402 is configured to support the apparatus 400 in performing step S203 in Embodiment 1 or Embodiment 2.

Optionally, the apparatus further includes a first receiving module 403. The first receiving module 403 is configured to receive a second message sent by the second device, where the second message includes a subscription identifier, and the subscription identifier is used to identify a subscription generated based on the plurality of event streams. The first receiving module 403 is configured to support the apparatus 400 in performing S205 in Embodiment 1 or Embodiment 2.

Optionally, the apparatus further includes a second receiving module 404. The second receiving module 404 is configured to receive a third message sent by the second device, where the third message includes the subscription identifier and data of at least one event stream in the plurality of event streams. The second receiving module 404 is configured to support the apparatus 400 in performing S207 in Embodiment 1 or Embodiment 2. Optionally, the third message further includes the group identifier.

Optionally, the apparatus further includes an obtaining module 405 and a second sending module 406. The obtaining module 405 is configured to obtain a policy based on the data of the at least one event stream, where the policy is used to indicate the second device to perform an action corresponding to the at least one event stream. The second sending module 406 is configured to send the policy to the second device. The obtaining module 405 is configured to support the apparatus 400 in performing S301 in Embodiment 2. The second sending module 406 is configured to support the apparatus 400 in performing S302 in Embodiment 2.

Optionally, the apparatus further includes a third receiving module 407. The third receiving module 407 is configured to receive a capability identifier sent by the second device, where the capability identifier is used to identify that the second device supports subscribing to a plurality of event streams. The third receiving module 407 is configured to support the apparatus 400 in performing S201 in Embodiment 1 or Embodiment 2.

Optionally, the apparatus further includes a third sending module 408. The third sending module 408 is configured to send a correspondence to the second device, where the correspondence includes the group identifier and the plurality of event streams. The third sending module 408 is configured to support the apparatus 400 in performing S201 in Embodiment 1 or Embodiment 2.

The first receiving module 403 and the second receiving module 404 in this embodiment of this application may be one receiving unit. The first sending module 402, the second sending module 406, and the third sending module 408 may be one sending unit.

In the apparatus provided in this embodiment of this application, the first message used to subscribe to event streams that is generated by the generation module 401 can enable the second device that receives the first message to report, based on the subscription, the data of the plurality of event streams, helping save network resources.

Figure 5:
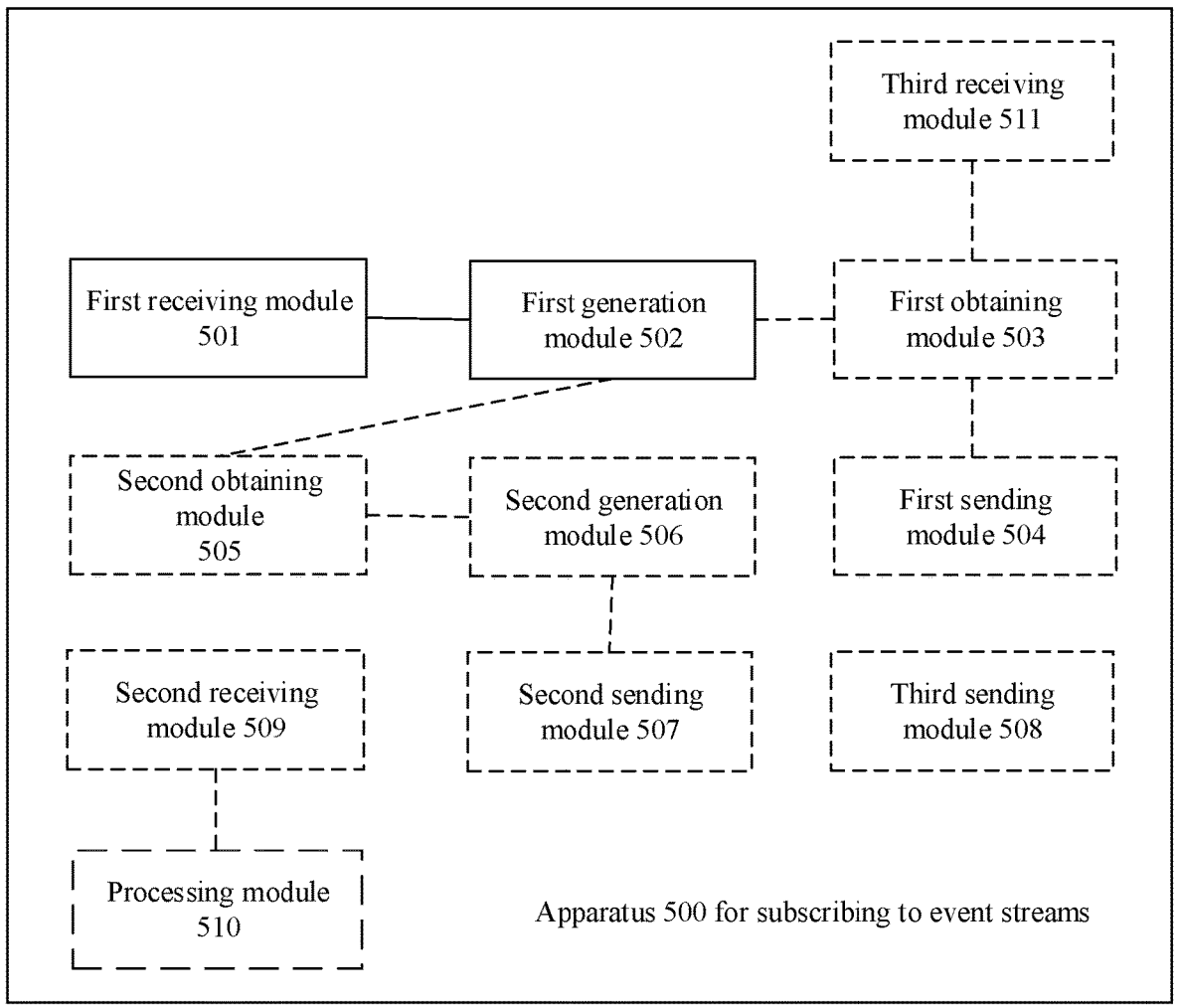
FIG. 5 is a schematic diagram of a structure of an apparatus for subscribing to event streams according to an embodiment of this application.

FIG. 5 is a schematic diagram of a structure of an apparatus for subscribing to event streams according to an embodiment of this application. The apparatus 500 provided in the embodiment corresponding to FIG. 5 is described from a perspective of a logical structure. The apparatus 500 provided in the embodiment corresponding to FIG. 5 may be the device 102 in Embodiment 1 or Embodiment 2. A first device in the embodiment corresponding to FIG. 5 may be the control device 101 in Embodiment 1 or Embodiment 2. With reference to FIG. 5, the following describes the structure of the apparatus provided in this embodiment of this application.

The apparatus 500 includes a first receiving module 501 and a first generation module 502. The first receiving module 501 is configured to receive a first message used to subscribe to event streams that is sent by the first device, where the first message includes a group identifier, and the group identifier corresponds to a plurality of event streams. The first generation module 502 is configured to generate, based on the first message, a subscription corresponding to the plurality of event streams. The first receiving module 501 is configured to support the apparatus 500 in performing S203 in Embodiment 1 or Embodiment 2. The first generation module 502 is configured to support the apparatus 500 in performing S204 in Embodiment 1 or Embodiment 2.

Optionally, the apparatus further includes a first obtaining module 503 and a first sending module 504. The first obtaining module 503 is configured to obtain a subscription identifier, where the subscription identifier is used to identify the subscription generated based on the plurality of event streams. The first sending module 504 is configured to send a second message to the first device, where the second message includes the subscription identifier. The first obtaining module 503 is configured to support the apparatus 500 in performing S204 in Embodiment 1 or Embodiment 2. The first sending module 504 is configured to support the apparatus 500 in performing S205 in Embodiment 1 or Embodiment 2.

Optionally, the apparatus further includes a second obtaining module 505, a second generation module 506, and a second sending module 507. The second obtaining module 505 is configured to obtain data of at least one event stream in the plurality of event streams. The second generation module 506 is configured to generate a third message based on the data of the at least one event stream, where the third message includes the subscription identifier and the data of the at least one event stream. The second sending module 507 is configured to send the third message to the first device. The second obtaining module 505 and the second generation module 506 are configured to support the apparatus 500 in performing S206 in Embodiment 1 or Embodiment 2. The second sending module 507 is configured to support the apparatus 500 in performing S207 in Embodiment 1 or Embodiment 2. Optionally, the third message further includes the group identifier.

For example, the second obtaining module 505 is specifically configured to: determine, based on the group identifier, the plurality of event streams corresponding to the group identifier; and periodically obtain data of one or more event streams in the plurality of event streams, or obtain the data of the one or more event streams in the plurality of event streams after states of the one or more event streams are changed.

Optionally, the apparatus further includes a third sending module 508. The third sending module 508 is configured to send a capability identifier to the first device, where the capability identifier is used to identify that the second device supports subscribing to a plurality of event streams. The third sending module 508 is configured to support the apparatus 500 in performing S201 in Embodiment 1 or Embodiment 2.

Optionally, the apparatus further includes a second receiving module 509 and a processing module 510. The second receiving module 509 is configured to receive a policy sent by the first device, where the policy is used to indicate the second device to perform an action corresponding to the at least one event stream. The processing module 510 is configured to perform the action according to the policy. The second receiving module 509 is configured to support the apparatus 500 in performing S302 in Embodiment 2. The processing module 510 is configured to support the apparatus 500 in performing S303 in Embodiment 2.

Optionally, the apparatus further includes a third receiving module 511. The third receiving module 511 is configured to receive a correspondence sent by the first device, where the correspondence includes the group identifier and the plurality of event streams. The third receiving module 511 is configured to support the apparatus 500 in performing S201 in Embodiment 1 or Embodiment 2.

The first receiving module 501, the second receiving module 509, and the third receiving module 511 in this embodiment of this application may be one receiving unit. The first sending module 504, the second sending module 507, and the third sending module 508 may be one sending unit. The first obtaining module 503 and the second obtaining module 505 may be one obtaining unit.

In the apparatus provided in this embodiment of this application, the first generation module 502 generates, based on the group identifier in the first message, the subscription corresponding to the plurality of event streams, to subsequently report the data of the plurality of event streams at a time, thereby helping save network resources.

Figure 6:
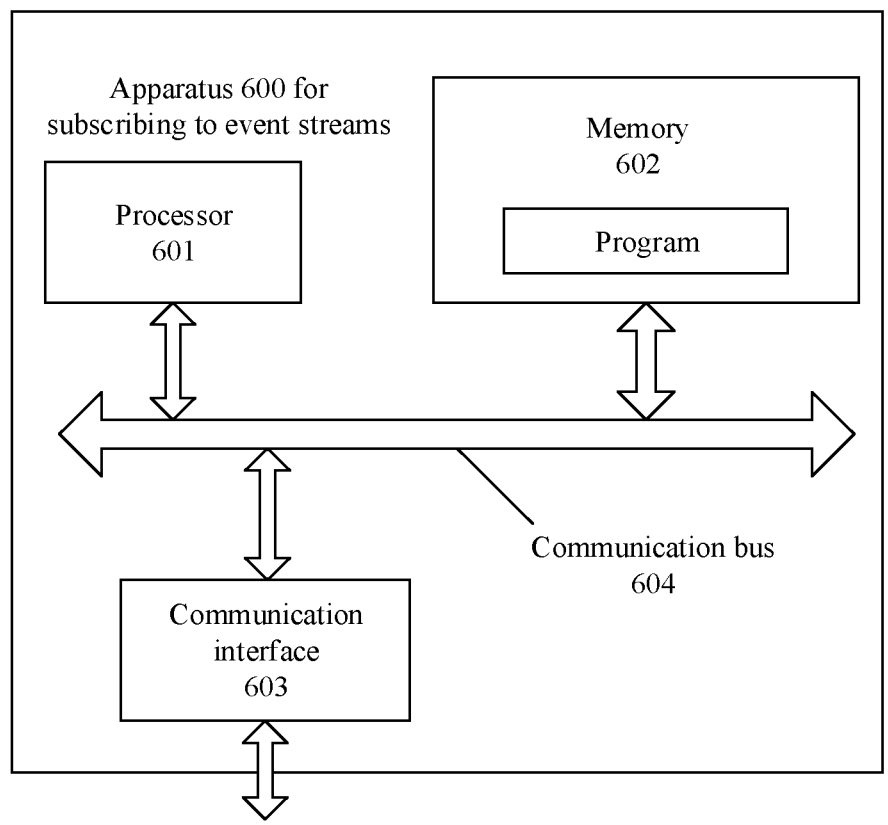
FIG. 6 is a schematic diagram of a structure of an apparatus for subscribing to event streams according to an embodiment of this application.

FIG. 6 is a schematic diagram of a structure of an apparatus for subscribing to event streams according to an embodiment of this application. The apparatus 600 provided in the embodiment corresponding to FIG. 6 may be the apparatus 400 provided in the embodiment corresponding to FIG. 4. The apparatus 600 provided in the embodiment corresponding to FIG. 6 is described from a perspective of a hardware structure. The apparatus 600 provided in the embodiment corresponding to FIG. 6 may implement the function of the control device 101 in Embodiment 1 or Embodiment 2. The apparatus 600 provided in the embodiment corresponding to FIG. 6 includes a processor 601, a memory 602, a communication bus 604, and a communication interface 603. The processor 601, the memory 602, and the communication interface 603 are connected by using a communication bus 604. The memory 602 is configured to store a program. The processor 601 performs, according to executable instructions included in the program read from the memory 602, method steps performed by the control device 101 in Embodiment 1 or Embodiment 2. The processor 601 may perform negotiation and communication with a second device, namely, the device 102 in Embodiment 1 or Embodiment 2 by using the communication interface 603.

The communication interface 603 is configured to support the apparatus 600 in performing S201, S203, S205, and S207 in Embodiment 1 or Embodiment 2. The communication interface 603 is further configured to support the apparatus 600 in performing S302 in Embodiment 2. The processor 601 is configured to support the apparatus 600 in performing S202 in Embodiment 1 or Embodiment 2. The processor 601 is further configured to support the apparatus 600 in performing S301 in Embodiment 2. The memory 602 is configured to: not only store program code and data, but also buffer the group identifier, the subscription identifier, and the data of the N event streams in Embodiment 1 or Embodiment 2.

Figure 7:
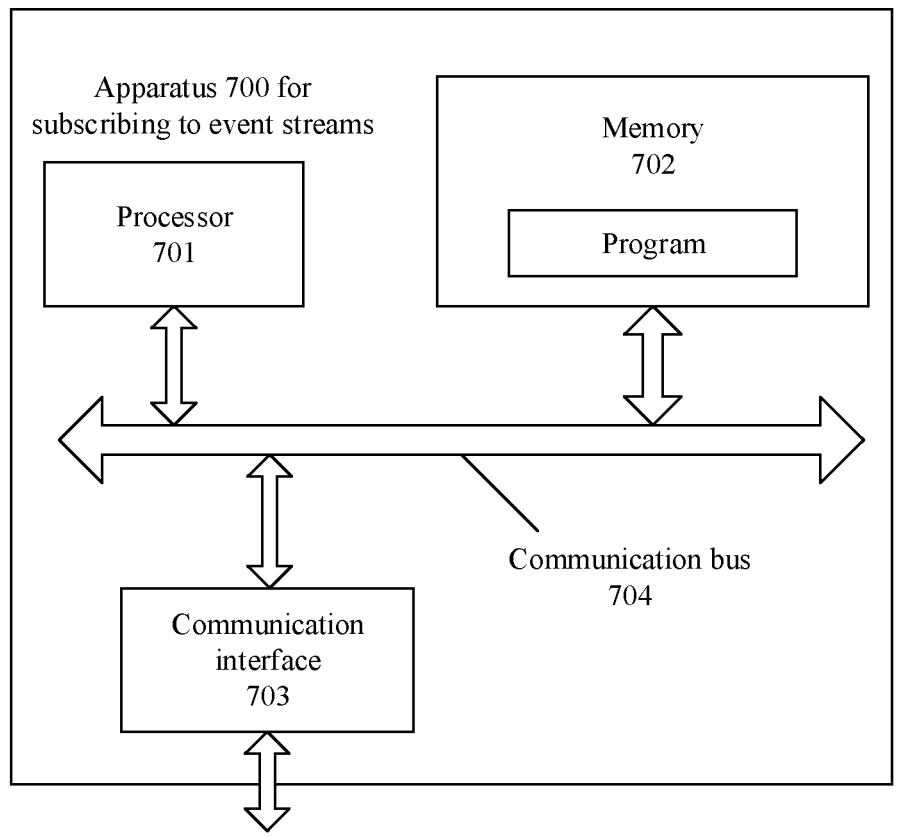
FIG. 7 is a schematic diagram of a structure of an apparatus for subscribing to event streams according to an embodiment of this application.

FIG. 7 is a schematic diagram of a structure of an apparatus for subscribing to event streams according to an embodiment of this application. The apparatus 700 provided in the embodiment corresponding to FIG. 7 may be the apparatus 500 provided in the embodiment corresponding to FIG. 5. The apparatus 700 provided in the embodiment corresponding to FIG. 7 is described from a perspective of a hardware structure. The apparatus 700 provided in the embodiment corresponding to FIG. 7 may implement the function of the device 102 in Embodiment 1 or Embodiment 2. The apparatus 700 provided in the embodiment corresponding to FIG. 7 includes a processor 701, a memory 702, a communication bus 704, and a communication interface 703. The processor 701, the memory 702, and the communication interface 703 are connected by using the communication bus 704. The memory 702 is configured to store a program. The processor 701 performs, according to executable instructions included in the program read from the memory 702, method steps performed by the control device 102 in Embodiment 1 or Embodiment 2. The processor 701 may perform negotiation and communication with a first device, namely, the control device 101 in Embodiment 1 or Embodiment 2 by using the communication interface 703.

The communication interface 703 is configured to support the apparatus 700 in performing S201, S203, S205, and S207 in Embodiment 1 or Embodiment 2. The communication interface 703 is further configured to support the apparatus 700 in performing S302 in Embodiment 2. The processor 601 is configured to support the apparatus 700 in performing S204 and S206 in Embodiment 1 or Embodiment 2. The processor 601 is further configured to support the apparatus 700 in performing S303 in Embodiment 2. The memory 602 is configured to: not only store program code and data, but also buffer the group identifier, the subscription identifier, the data of the N event streams, and the policy in Embodiment 1 or Embodiment 2.

An embodiment of this application provides a system for subscribing to event streams. The system includes a first device and a second device. An apparatus 400 for subscribing to event streams or an apparatus 600 for subscribing to event streams may be disposed on the first device. An apparatus 500 for subscribing to event streams or an apparatus 700 for subscribing to event streams may be disposed on the second device. The first device may perform the action performed by the control device 101 in Embodiment 1 or Embodiment 2. The second device may perform the action performed by the device 102 in Embodiment 1 or Embodiment 2.

A general-purpose processor mentioned in the embodiments of this application may be a microprocessor, or the processor may be any conventional processor. Steps of the method disclosed with reference to the embodiments of the present disclosure may be directly implemented by a combination of hardware and a software module in the processor. When the method is implemented by using software, code that implements the foregoing functions may be stored in a computer-readable medium. The computer-readable medium includes a computer storage medium. The storage medium may be any available medium accessible to a computer. The following is used as an example but is not limited: The computer-readable medium may be a random access memory (RAM), a read-only memory (ROM), an electrically erasable programmable read-only memory (EEPROM), a compact disc read-only memory (CD-ROM) or another compact disc storage, a magnetic disk storage medium or another magnetic storage device, or any other medium that can be used to carry or store expected program code in an instruction or data structure form and can be accessed by a computer. The computer-readable medium may be a compact disc (CD), a laser disc, a digital video disc (DVD), a floppy disk, or a Blu-ray disc.

The embodiments in this specification are all described in a progressive manner. For same or similar parts in the embodiments, refer to these embodiments. Each embodiment focuses on a difference from other embodiments.

Especially, a system embodiment is basically similar to a method embodiment, and therefore is described briefly. For related parts, refer to some descriptions in the method embodiments.

What is claimed is:

1. A method for subscribing to event streams, wherein the method comprises:
   generating, by a first device, a first message used to subscribe to event streams, wherein the first message comprises a group identifier, and the group identifier corresponds to a plurality of event streams; and
   sending, by the first device, the first message to a second device, to obtain data of the plurality of event streams corresponding to the group identifier.

2. The method according to claim 1, wherein after the sending, by the first device, the first message to the second device, the method further comprises:
   receiving, by the first device, a second message sent by the second device, wherein the second message comprises a subscription identifier, and the subscription identifier is used to identify a subscription generated based on the plurality of event streams.

3. The method according to claim 2, wherein after the sending, by the first device, the first message to the second device, the method further comprises:
   receiving, by the first device, a third message sent by the second device, wherein the third message comprises the subscription identifier and data of at least one event stream in the plurality of event streams.

4. The method according to claim 3, wherein after the receiving, by the first device, a third message sent by the second device, the method further comprises:
   obtaining, by the first device, a policy based on the data of the at least one event stream, wherein the policy is used to indicate the second device to perform an action corresponding to the at least one event stream; and
   sending, by the first device, the policy to the second device.

5. The method according to claim 1, wherein before the sending, by the first device, the first message to the second device, the method further comprises:
   receiving, by the first device, a capability identifier sent by the second device, wherein the capability identifier is used to identify that the second device supports subscribing to a plurality of event streams.

6. A method for subscribing to event streams, wherein the method comprises:
   receiving, by a second device, a first message used to subscribe to event streams that is sent by a first device, wherein the first message comprises a group identifier, and the group identifier corresponds to a plurality of event streams; and
   generating, by the second device based on the first message, a subscription corresponding to the plurality of event streams.

7. The method according to claim 6, wherein after the generating the subscription corresponding to the plurality of event streams, the method further comprises:
   obtaining, by the second device, a subscription identifier, wherein the subscription identifier is used to identify the subscription generated based on the plurality of event streams; and
   sending, by the second device, a second message to the first device, wherein the second message comprises the subscription identifier.

8. The method according to claim 7, wherein after the sending, by the second device, the second message to the first device, the method further comprises:
   obtaining, by the second device, data of at least one event stream in the plurality of event streams;
   generating, by the second device, a third message based on the data of the at least one event stream, wherein the third message comprises the subscription identifier and the data of the at least one event stream; and
   sending, by the second device, the third message to the first device.

9. The method according to claim 8, wherein the obtaining, by the second device, data of at least one event stream in the plurality of event streams comprises:
   determining, by the second device based on the group identifier, the plurality of event streams corresponding to the group identifier; and
   periodically obtaining, by the second device, data of one or more event streams in the plurality of event streams, or obtaining, by the second device, the data of the one or more event streams in the plurality of event streams after states of the one or more event streams are changed.

10. The method according to claim 6, wherein before the receiving, by a second device, a first message used to subscribe to event streams that is sent by a first device, the method further comprises:
    sending, by the second device, a capability identifier to the first device, wherein the capability identifier is used to identify that the second device supports subscribing to a plurality of event streams.

11. An apparatus for subscribing to event streams, wherein the apparatus is disposed on a first device, and the apparatus comprises:
    a memory storing instructions; and
    a processor coupled to the memory and configured to execute the instructions to:
    generate a first message used to subscribe to event streams, wherein the first message comprises a group identifier, and the group identifier corresponds to a plurality of event streams; and
    send the first message to a second device, to obtain data of the plurality of event streams corresponding to the group identifier.

12. The apparatus according to claim 11, wherein the processor coupled to the memory is further configured to execute the instructions to:
    receive a second message sent by the second device, wherein the second message comprises a subscription identifier, and the subscription identifier is used to identify a subscription generated based on the plurality of event streams.

13. The apparatus according to claim 12, wherein the processor coupled to the memory is further configured to execute the instructions to:
    receive a third message sent by the second device, wherein the third message comprises the subscription identifier and data of at least one event stream in the plurality of event streams.

14. The apparatus according to claim 13, wherein the processor coupled to the memory is further configured to execute the instructions to:
    obtain a policy based on the data of the at least one event stream, wherein the policy is used to indicate the second device to perform an action corresponding to the at least one event stream; and
    send the policy to the second device.

15. The apparatus according to claim 11, wherein the processor coupled to the memory is further configured to execute the instructions to:
receive a capability identifier sent by the second device, wherein the capability identifier is used to identify that the second device supports subscribing to a plurality of event streams.

16. An apparatus for subscribing to event streams, wherein the apparatus is disposed on a second device, and the apparatus comprises:
a memory storing instructions; and
a processor coupled to the memory and configured to execute the instructions to:
receive a first message used to subscribe to event streams that is sent by a first device, wherein the first message comprises a group identifier, and the group identifier corresponds to a plurality of event streams; and
generate, based on the first message, a subscription corresponding to the plurality of event streams.

17. The apparatus according to claim 16, wherein the processor coupled to the memory is further configured to execute the instructions to:
obtain a subscription identifier, wherein the subscription identifier is used to identify the subscription generated based on the plurality of event streams; and
send a second message to the first device, wherein the second message comprises the subscription identifier.

18. The apparatus according to claim 17, wherein the processor coupled to the memory is further configured to execute the instructions to:
obtain data of at least one event stream in the plurality of event streams;
generate a third message based on the data of the at least one event stream, wherein the third message comprises the subscription identifier and the data of the at least one event stream; and
send the third message to the first device.

19. The apparatus according to claim 18, wherein the processor coupled to the memory to is further configured to execute the instructions to:
determine, based on the group identifier, the plurality of event streams corresponding to the group identifier; and
periodically obtain data of one or more event streams in the plurality of event streams, or obtain the data of the one or more event streams in the plurality of event streams after states of the one or more event streams are changed.

20. The apparatus according to claim 16, wherein the processor coupled to the memory is further configured to execute the instructions to:
send a capability identifier to the first device, wherein the capability identifier is used to identify that the second device supports subscribing to a plurality of event streams.

* * * * *